(12) United States Patent
Dillard

(10) Patent No.: US 8,459,400 B2
(45) Date of Patent: Jun. 11, 2013

(54) FORCE STEER AXLE ASSEMBLY WITH REDUNDANT CENTERING

(75) Inventor: Jason Dillard, Springfield, MO (US)

(73) Assignee: Ridewell Corporation, Springfield, MO (US)

( * ) Notice: Subject to any disclaimer, the term of this patent is extended or adjusted under 35 U.S.C. 154(b) by 19 days.

(21) Appl. No.: 13/110,668

(22) Filed: May 18, 2011

(65) Prior Publication Data

US 2011/0291373 A1    Dec. 1, 2011

Related U.S. Application Data

(60) Provisional application No. 61/347,902, filed on May 25, 2010.

(51) Int. Cl.
*B62D 13/00* (2006.01)

(52) U.S. Cl.
USPC ........ 180/420; 180/441; 180/442; 280/89.11; 92/13

(58) Field of Classification Search
USPC .................. 280/81.5, 81.6, 89.11; 180/414, 180/415, 442, 417, 420, 441; 92/13
See application file for complete search history.

(56) References Cited

U.S. PATENT DOCUMENTS

| | | | | |
|---|---|---|---|---|
| 1,745,117 A | * | 1/1930 | Plank | 280/103 |
| 2,755,876 A | * | 7/1956 | Muller | 180/435 |
| 3,765,306 A | * | 10/1973 | Luft | 92/117 A |
| 4,410,193 A | * | 10/1983 | Howard | 280/90 |
| 4,669,567 A | * | 6/1987 | Nakamura et al. | 180/415 |
| 4,781,262 A | * | 11/1988 | Nakamura et al. | 180/414 |
| 5,579,228 A | | 11/1996 | Kimbrough et al. | |
| 5,941,338 A | * | 8/1999 | Miller et al. | 180/421 |
| 6,272,947 B1 | * | 8/2001 | Howard | 74/499 |
| 7,182,353 B2 | * | 2/2007 | Divers | 280/88 |
| 7,207,579 B1 | * | 4/2007 | Howard | 280/89.11 |
| 7,207,580 B2 | * | 4/2007 | Howard | 280/89.11 |
| 7,793,965 B2 | | 9/2010 | Padula | |
| 2008/0078606 A1 | * | 4/2008 | Fox | 180/434 |

* cited by examiner

*Primary Examiner* — Paul N Dickson
*Assistant Examiner* — Timothy Wilhelm
(74) *Attorney, Agent, or Firm* — Lathrop & Gage LLP

(57) ABSTRACT

A force steer axle assembly is disclosed for providing redundant fail-safe steering control to an axle. The assembly includes a centering cylinder for maintaining the axle in a centered position and for steering the axle as directed. The assembly further includes a hydraulic control system for providing centering and steering actuation to the cylinder, and an electrical control system for receiving user input and controlling the hydraulic system.

5 Claims, 18 Drawing Sheets

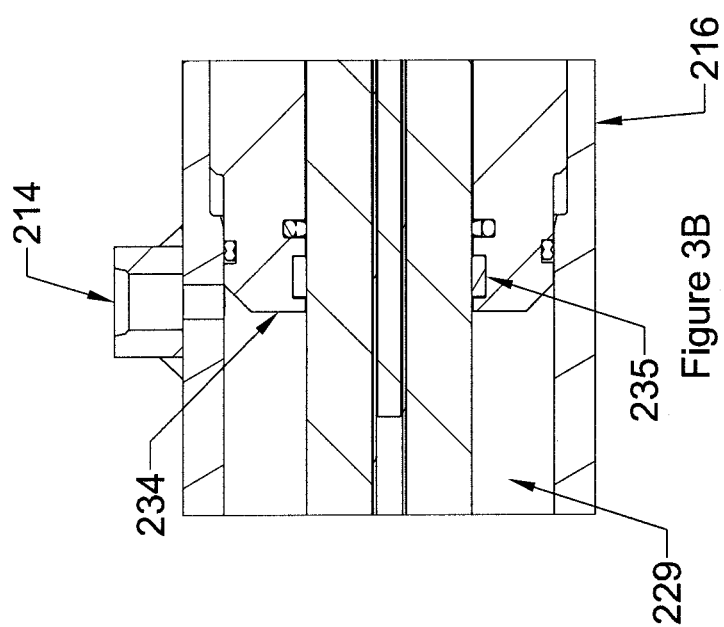

FORCE STEER AXLE ASSEMBLY WITH REDUNDANT CENTERING

RELATED APPLICATION

This application claims priority to U.S. Patent Application Ser. No. 61/347,902, filed May 25, 2010, the disclosure of which is incorporated herein by reference.

BACKGROUND

1. Field of the Invention

The force steer axle assembly is in the field of steerable suspension systems for automobiles. More specifically, the force steer axle is utilized for suspension systems for steerable trailers. The force steer axle described herein has improved control mechanisms to insure that the steerable axles are maintained in a centered position when not in use for steering the trailer, and for providing steering control of the axle when necessary. The improved control mechanisms insure that the axle returns to a centered position upon a variety of failures in the system.

2. Description of the Related Art

A variety of steerable suspension systems for trailers are known. These suspension systems allow the wheels of a trailer to be articulated to aid in maneuvering long trailers or trailers with wide or unwieldy loads. The steerable systems are typically activated during fine maneuvering at lower speeds, and are returned to a centered position during normal driving and at higher speeds.

If the steerable axles are not maintained at a precisely centered position during normal driving excessive wear and tear on tires results. Similar to an automobile with a suspension system that is out of alignment, a steerable axle that is not centered during normal driving presents the tires at an angle to the direction of motion of the vehicle. Tire performance is degraded, steering characteristics may be impacted, and ultimately tire failure may result from the improper positioning of the steerable axle.

Many steerable axles currently used in this type of application do not adequately maintain the axle in the centered position during normal driving. They may lose their calibration through typical use. Alternatively, failures in one or more components of the control system for the steerable axles may cause the system to perform inadequately or fail to return to the centered position causing damage to the axle or the tires mounted on it.

SUMMARY OF THE INVENTION

The force steer axle assembly described herein provides a redundant steering system for an axle. The assembly is capable of maintaining the axle at the center position during normal use even if the control systems for the axle fail. The system does not require active control to maintain the centered position, or to return to that position after steering control inputs terminate.

BRIEF DESCRIPTION OF THE DRAWINGS

FIG. 3B is a detailed cross-sectional view of an embodiment of the centering cylinder.

DETAILED DESCRIPTION

Figure 1A:
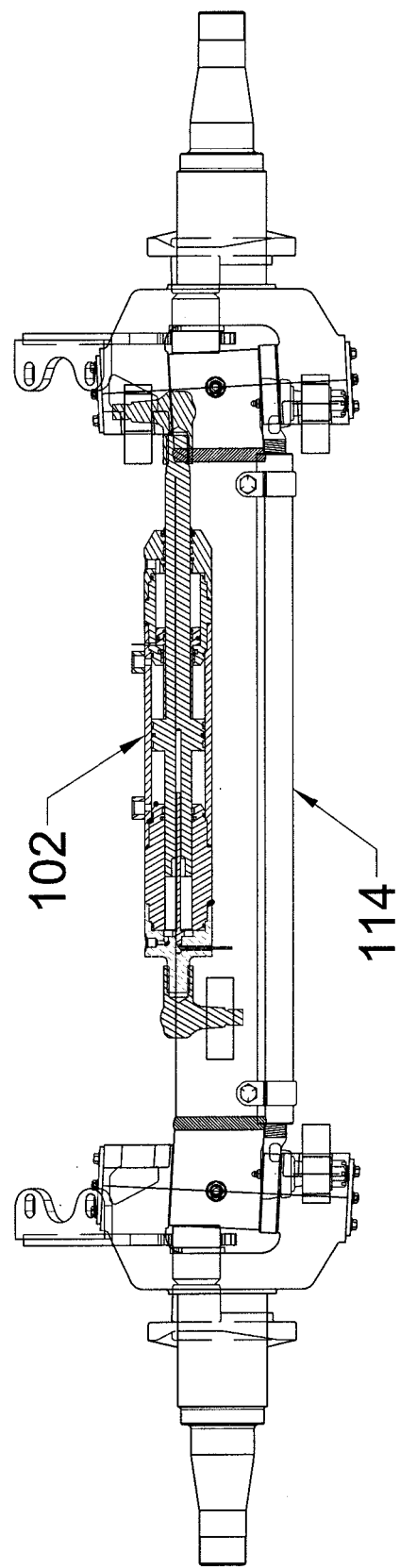
FIG. 1A is a side plan view of an axle assembly incorporating an embodiment of the force steer redundant centering axle assembly.
Figure 1B:
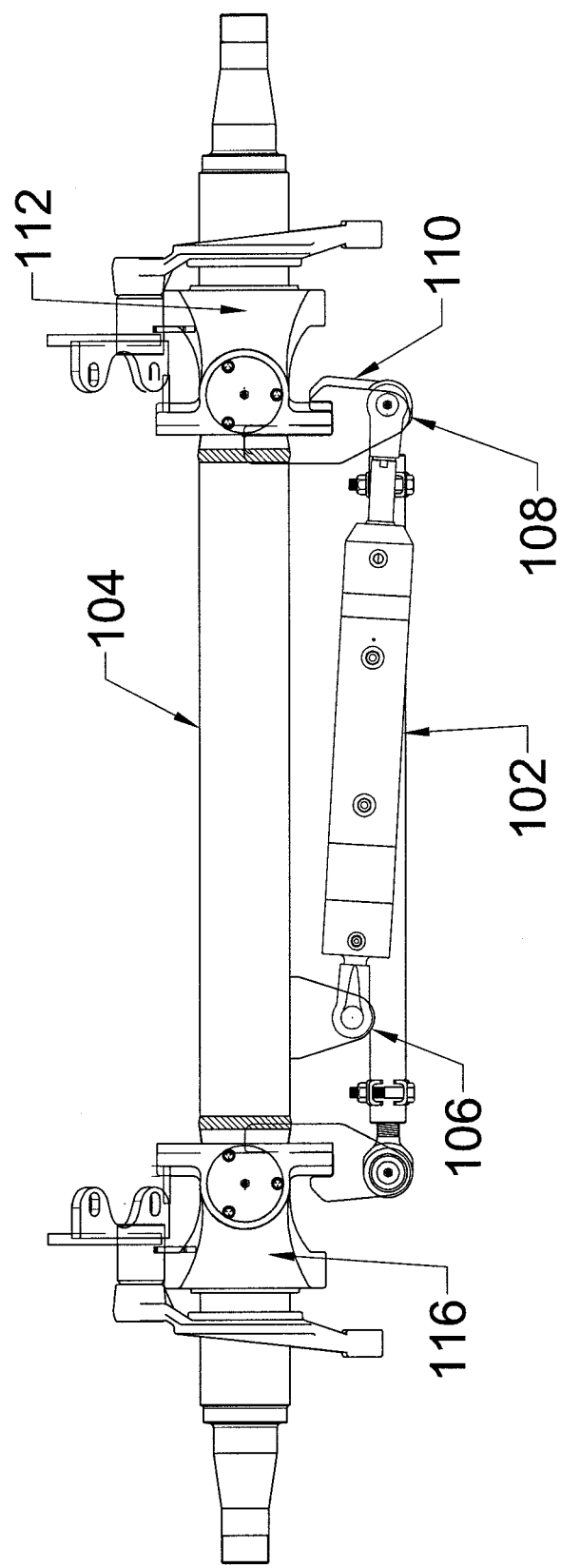
FIG. 1B is a top plan view of an embodiment of force steer axle assembly incorporating an embodiment of the redundant centering axle assembly.

Referring now to FIGS. 1A and 1B, a steering axle assembly is shown with the redundant centering system installed thereon. A centering cylinder 102 is pivotally attached to the steering axle 104 at a first end 106 of the cylinder 102. The second end 108 of the cylinder 102 is pivotally attached to steering arm 110 on steering knuckle 112. Steering knuckle 112 is pivotally attached to tie-rod 114, which is pivotally attached to steering knuckle 116, so that as steering knuckle 112 pivots the tie-rod 114 causes steering knuckle 116 to pivot substantially in concert with steering knuckle 112, such as is required by an Ackermann steering geometry. Steering knuckles 112 and 116 are pivotally attached to axle 104, and pivot around a kingpin axis. Axle 104 is attached to the frame of a vehicle by a suspension system, of which many are known in the art. As cylinder 102 extends or retracts, knuckles 112 and 116 are pivoted around their respective kingpin axis thus providing steering control to the vehicle in which the axle assembly is installed.

Figure 2A:
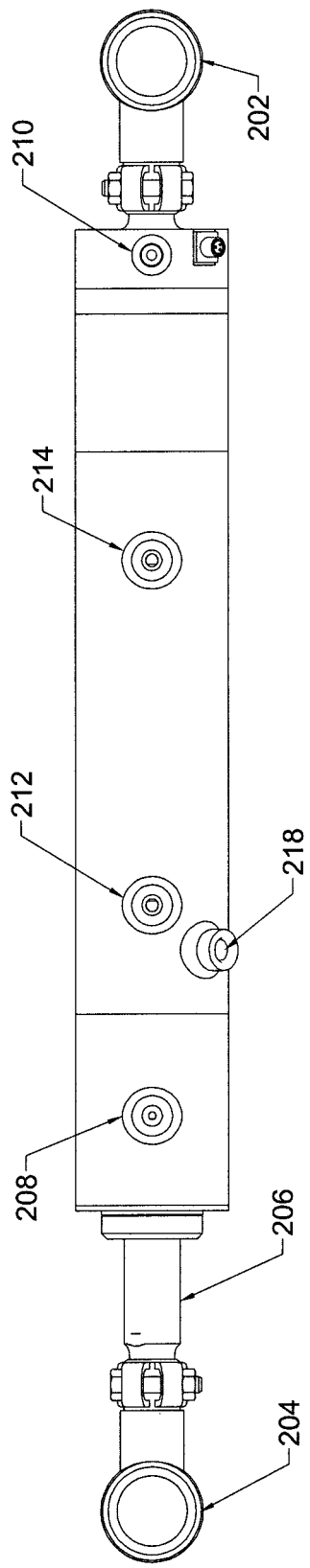
FIG. 2A is a plan view of an embodiment of the centering cylinder.

Referring now to FIG. 2A, an exterior view of the centering cylinder is shown. The exterior of the cylinder 102 is fixedly attached at a first end to pivotal mounting 202 and at a second end to pivotal mounting 204. The cylinder operates by extending or retracting piston ram assembly 206. The exterior of the cylinder in the embodiment shown has four ports susceptible to connection to hydraulic supply lines, and one or more drain ports. The embodiment shown in FIG. 2A has only one drain port though other embodiments of the cylinder may have multiple drain ports. The ports include two centering ports 208 and 210, and two steering ports 212 and 214, and one drain port 218.

Figure 2B:
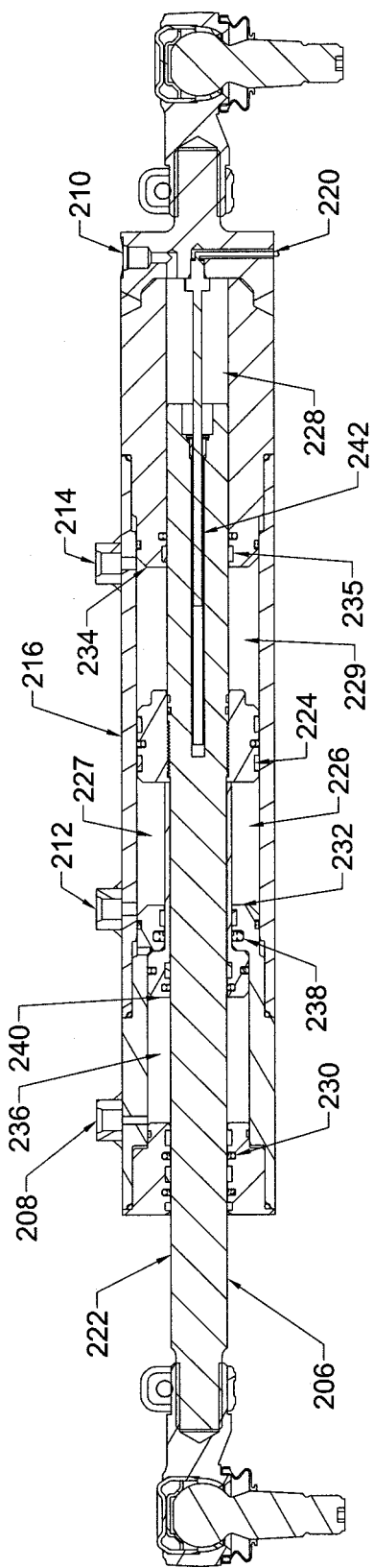
FIG. 2B is a cross-sectional view of an embodiment of the centering cylinder.

Referring now to FIG. 2B, a cross-sectional view of the centering cylinder 102 is depicted. The cylinder 102 has a casing 216 that may be comprised of multiple machined or cast components joined together by common methods to form the casing 216. In the embodiment shown in FIG. 2B the casing 216 is formed from five pieces which are provided with integral male and female threads or weld points for interconnection, although fewer pieces may be used to form the cylinder 102 in some embodiments.

The casing 216 has various apertures for connecting to hydraulic systems, such as ports 208, 210, 212 and 214 and drain ports 218, and other ports for access to the interior of the casing, such as port 220 for wires connected to instrumentation inside the casing 216 and a port for piston ram assembly 206. Casing 216 has various interior cavities for containing piston ram assembly 206 and other pistons and moveable parts, and for hydraulic fluid acting on the internal parts of the cylinder.

Piston ram assembly 206 comprises a ram 222 and piston 224. In some embodiments the ram 222 and piston 224 may be formed from a single component, while in other embodiments they may be formed separately from multiple pieces and joined by welding or by integral screw threads. The ram 222 extends through aperture 230, through cavities 236 and 226, and with its end disposed adjacent to cavity 228. The cavities are defined by internal bulkheads 234 and 238 formed in casing 216.

The piston 224 is disposed within the first cavity 226 within the casing 216, and divides the cavity 226 into a first chamber 227 and a second chamber 229. Piston ram assembly 206 is slidably retained in the casing 216 by wear bands, seals and O-rings disposed in the casing 216, near aperture 230 and in bulkheads 234 and 238, and in the piston 224, forming seals between the cavities. As piston ram assembly 206 slides back and forth, its range of motion is defined by contact between piston 224 and a first chamber wall 232 and the wall of bulkhead 234 of the first cavity 226. A third cavity 236 is formed by casing 216 and bulkhead 238.

In the embodiment shown in FIG. 2B, a sleeve piston 240 is disposed around ram 222 of piston ram assembly 206 with its head in a second cavity 236. The head of the piston 240 is disposed in cavity 236 with the shaft of piston 240 comprising a thin casing around ram 222 and extending through the aperture in bulkhead 238 into chamber 227 of cavity 226. Wear bands and O-rings in the head of piston 240 seal the interfaces with the interior surface of casing 216 and ram 222. Optional wear bands may also be disposed on the inner diameter of the shaft of piston 240 near the end of the shaft adjacent to piston 224.

Sleeve piston 240 is slidably disposed on ram 222 of piston ram assembly 206. The length of the shaft of piston 240 is determined so that when the head of piston 240 is disposed against bulkhead 238 and when piston 224 is simultaneously disposed against the end of the shaft of piston 240, that piston 224 is located precisely in the center of the range of motion of piston ram assembly 206 in casing 216.

Port 208 is in fluidic communication with cavity 236, allowing hydraulic fluid to be pumped into and out of the cavity thus applying pressure to the head of piston 240. Port 210 is in fluidic communication with cavity 228, allowing hydraulic fluid to be pumped into and out of the cavity thus applying pressure to the end of ram 222 of piston 206. As will be further described below, hydraulic fluid is used in these chambers to return the piston 206 to the center position, and to maintain it at the center position.

Port 212 is in fluidic communication with chamber 227 of cavity 226, and port 214 is in fluidic communication with chamber 229 of cavity 226. Hydraulic fluid is maintained in both chambers through ports 212 and 214. When the amount of fluid in the cavities 227 and 229 is fixed, piston 206 remains substantially stationary, and when hydraulic fluid is pumped into one chamber and evacuated from the other chamber, then the piston ram assembly 206 will translate away from the chamber into which fluid is being pumped, thus extending or retracting ram 222 from casing 216. In this manner, by pumping and evacuating hydraulic fluid from the chambers in cavity 226 the piston may be extended or retracted. The hydraulic fluid in chambers 227 and 229 also contribute to the movement of piston 206 by apply opposing forces to the piston 224, and the actual movement of piston 224 results from the balance of pressures exerted by all chambers in casing 216. External forces on the cylinder, such as shocks from irregularities in the road may cause pressure spikes in the fluid in the cavities in casing 216, however the fluid in cavities 227 and 229 typically absorb the force of such pressure spikes.

In the embodiment shown in FIGS. 2A and 2B, a linear displacement measurement device 242 is provided. Device 242 measures the linear displacement of ram 222 in casing 216. The device 242 provides a measure of the extension or retraction of the ram 222. The device 242 may be a linear variable differential transformer (LVDT) or other similar device for measuring linear displacement. The device 242 may be electrically or otherwise connected to the control system by means of the port 220 allowing access to the interior of casing 216. The device 242 shown in FIG. 2 extends into a cavity formed in the center of ram 222, though other types of device 242 may have different shapes or requirements.

Figure 3A:
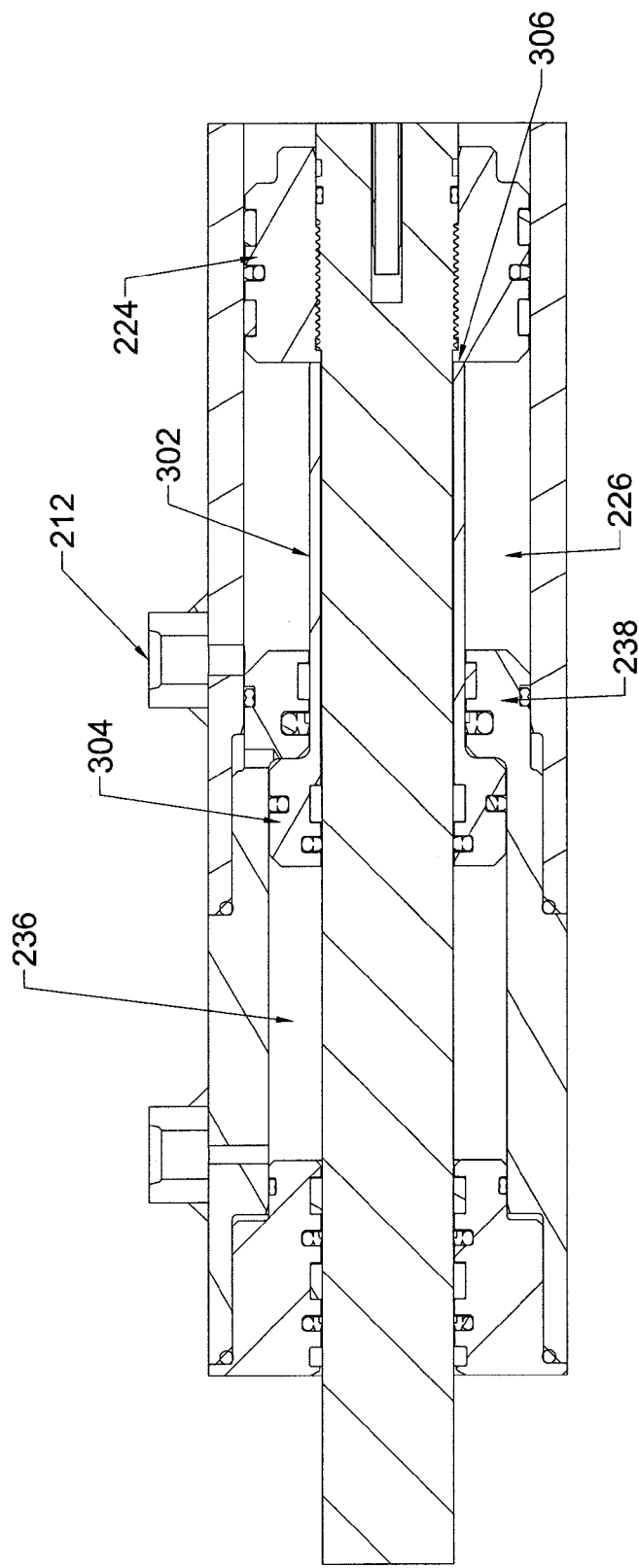
FIG. 3A is a detailed cross-sectional view of an embodiment of the centering cylinder.

Referring now to FIG. 3A, a detailed cross-sectional view of the sleeve piston 240 is depicted. Sleeve piston 240 comprises a ram 302 and head 304 with an aperture disposed along the cylindrical axis of the piston 240 for slidably receiving ram 222 of piston ram assembly 206. Piston 240 is slidably disposed within the casing 216 with head 304 disposed in cavity 236 and capable of sliding back and forth within the cavity along ram 222. Ram 302 extends along ram 222 through the aperture in bulkhead 238 into cavity 226. The end 306 of ram 302 contacts piston 224 of piston ram assembly 206 when the piston ram assembly 206 is in the centered and extended positions.

Figure 4A:
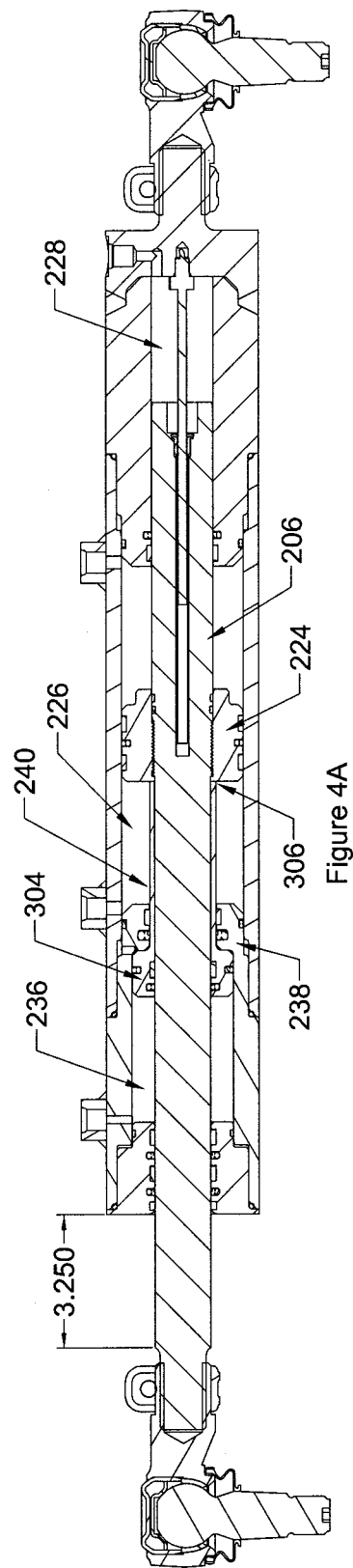
FIG. 4A is a cross-sectional view of an embodiment of the centering cylinder in a centered configuration.
Figure 4B:
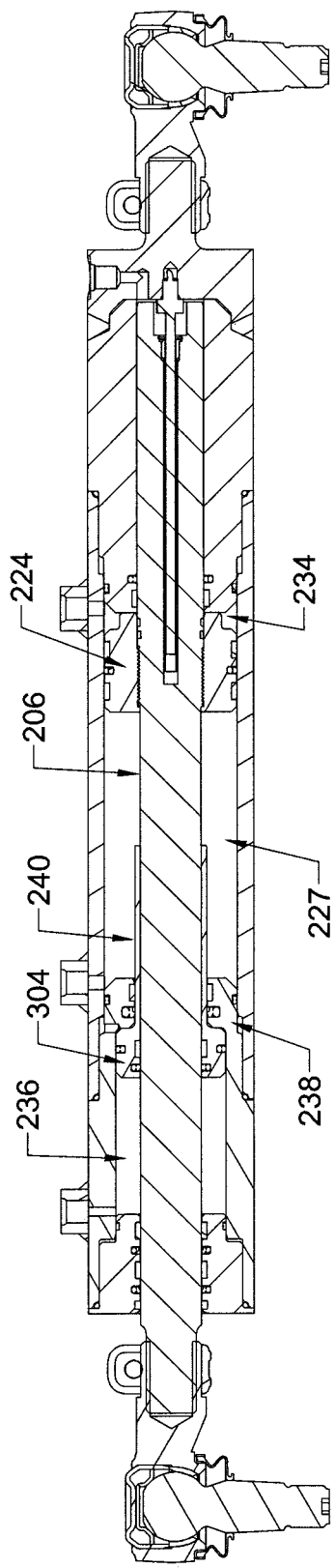
FIG. 4B is a cross-sectional view of an embodiment of the centering cylinder in a retracted configuration.
Figure 4C:
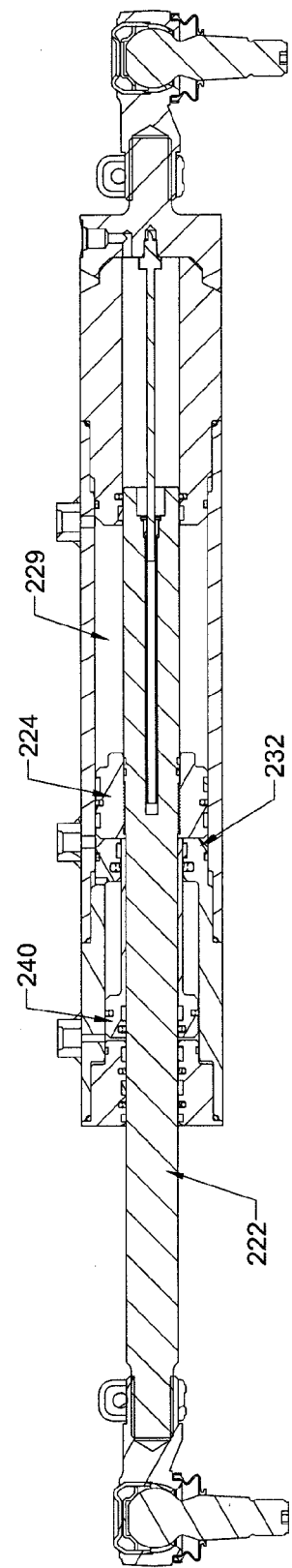
FIG. 4C is a cross-sectional view of an embodiment of the centering cylinder in an extended configuration.

Referring now to FIGS. 4A, 4B and 4C, when the driver of a vehicle incorporating an embodiment of the centering system directs the vehicle to turn, the control system described with reference to a later figure provides or evacuates hydraulic pressure to the cylinder 102 through ports 212 and 214 to cause it to extend or retract away from the center point maintained by the centering pressures maintained in cavities 228 and 236.

FIG. 4A depicts the centering cylinder in a centered position, with sleeve piston 240 fully inserted into cavity 226 by hydraulic fluid in cavity 236 holding head 304 of piston 240 against bulkhead 238. Simultaneously, piston 224 of piston ram assembly 206 is held against end 306 of piston 240 by hydraulic fluid in cavity 228. As will be described in more detail with reference to later figures, while the system is held in the center position ports 212 and 214 are blocked and fluid movement into and out of chambers 227 and 229 is prevented providing additional holding force to maintain the cylinder in the center position.

FIG. 4B depicts the cylinder in a retracted position when the cylinder is being used to steer a trailer. The control system described in reference to a later figure pumps hydraulic fluid into chamber 227 and evacuates hydraulic fluid from chamber 229 thus forcing piston 224 toward bulkhead 234. The pressure on the piston 224 from fluid in chamber 227 exceeds the pressure exerted on the end of ram 222 by the hydraulic fluid in cavity 228. The differential pressure causes ram 222 to translate toward cavity 228 until piston 224 contacts surface 234 or piston ram assembly 206 has reached a desired position. The pressure exerted by fluid in chamber 227 forces fluid from chamber 228 into a reservoir described in reference to a later figure. When the piston ram assembly 206 has reached the desired position, fluid flow into chamber 227 and out of 229 is halted, and the fluid in chambers 227 and 229 and in cavity 228 hold piston 224 in the desired position.

If it is desired to return to the centered position, hydraulic fluid is pumped into chamber 229 and out of chamber 227 until the cylinder returns to the centered position. When the system is in auto-steer mode, the return to center may be determined by the LVDT 242.

In a system failure, pressure from fluid in cavity 228 pushes piston ram assembly 206 back to the centered position and the centered position is maintained by mechanical contact between piston 224 and end 302 of sleeve piston 240.

FIG. 4C depicts the cylinder in an extended position. In one embodiment of the cylinder, the range of motion from full retraction to full extension is approximately 6 inches. The control system described in reference to a later figure pumps hydraulic fluid into chamber 229 and out of chamber 227, so that the pressure on piston 224 from cavities 229 and 228 exceeds the pressure on head 240 by the hydraulic fluid in cavity 236. The differential pressure causes ram 222 to translate toward cavity 236 until piston 224 contacts surface 232 or piston ram assembly 206 has reached a desired position. When the piston ram assembly 206 has reached the desired position, fluid flow into chamber 229 and out of chamber 227 is halted, and the fluid in chambers 227 and 229 and in cavities 228 and 236 hold piston 224 in the desired position. As ram 222 translates toward cavity 236, piston 240 is pushed by piston 224 and translates head 304 through cavity 236.

During auto-steer operation, if it is desired to return to the centered position, hydraulic fluid is pumped into chamber 227 and out of chamber 229 until piston 224 contacts sleeve 302 at end 306 as determined by measurement using the device 242.

In a system failure, the fluid in chamber 229 is free to evacuate to the system reservoir and the pressure on head 304 in cavity 236 pushes piston 240 back into cavity 226, and by mechanical contact of end 306 with piston 224, piston 206 is returned to the centered position.

FIGS. 4B and 4C depict the cylinder in the fully retracted and fully extended configurations, however with the application of appropriate hydraulic pressures, any intermediate position may be achieved and maintained by the cylinder.

Figure 5:
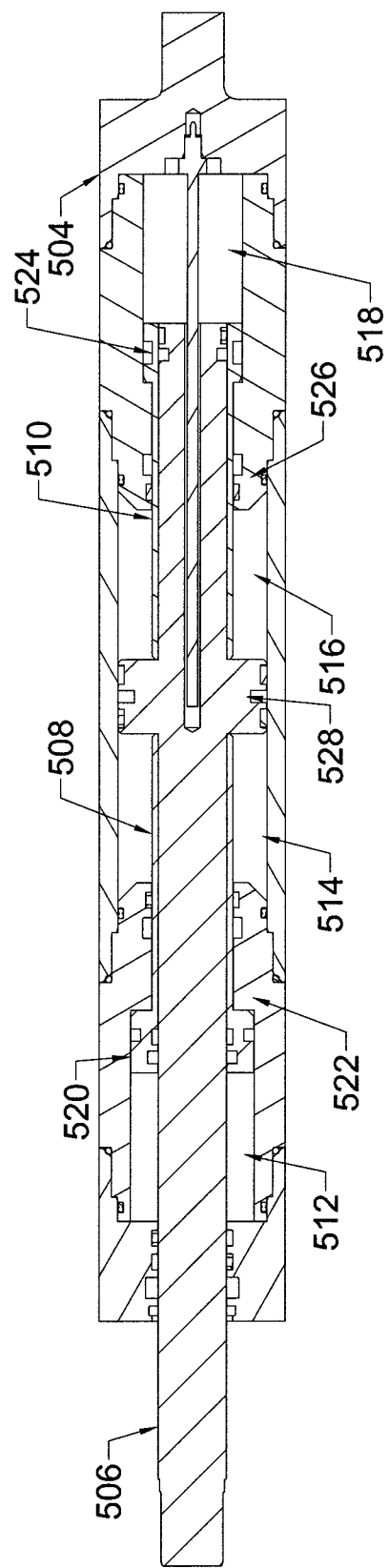
FIG. 5 is a cross-sectional view of a second embodiment of the centering cylinder.

Referring now to FIG. 5, a cross-sectional view of a second embodiment of the centering cylinder is depicted. The cylinder comprises a casing 504, piston ram assembly 506, and a first sleeve piston 508 and a second sleeve piston 510. The casing 504 is typically formed of metal and is comprised of multiple components fastened together after manufacture. Within the casing are a series of cavities 512, 514, 516 and 518 with ports providing fluidic communication with the cavities from the exterior of the casing 502.

The head 520 of sleeve piston 508 is disposed in cavity 512 with the shaft of piston 508 extending through bulkhead 522 into cavity 514. Similarly, head 524 of sleeve piston 510 is disposed in cavity 518 with the shaft of piston 510 extending through bulkhead 526 into 516. When head 520 is disposed against bulkhead 522 and head 524 is disposed against bulkhead 526, the piston 528 on piston ram assembly 506 is held at a centered position by the shafts of the two pistons 508 and 510. During normal operation, fluid blocked in cavities 514 and 516 provide additional holding force to maintain the cylinder in the centered position.

Figure 6A:
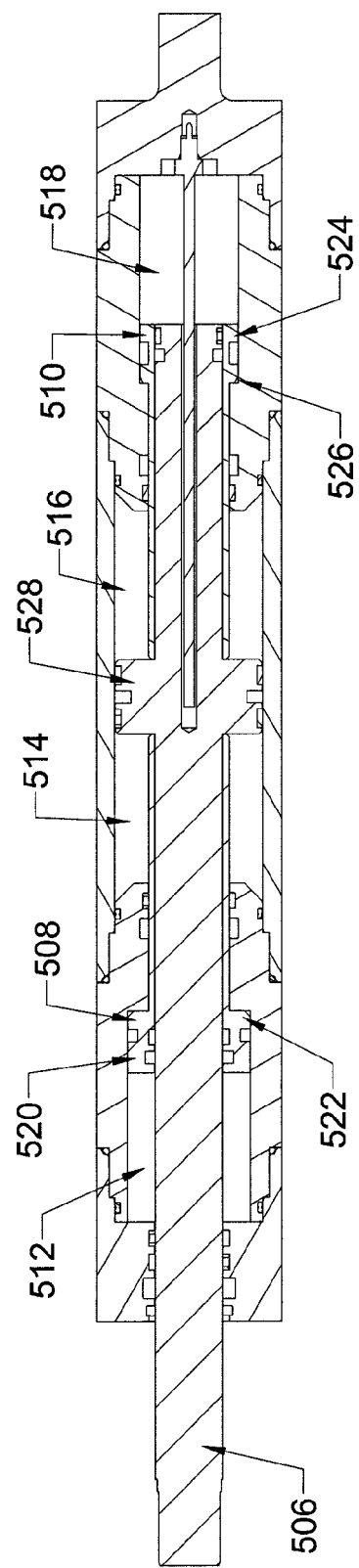
FIG. 6A is a cross-sectional view of a second embodiment of the centering cylinder in a centered configuration.

Referring now to FIG. 6A, an embodiment of the centering cylinder with two sleeve pistons is shown in a centering position. In this position, hydraulic fluid is maintained in cavities 512 and 518 exerting pressure on pistons 508 and 510, respectively, inward and holding the head 520 of piston 508 against bulkhead 522 and the head 524 of piston 510 against bulkhead 526. During normal operation, hydraulic fluid is maintained in chambers 514 and 516 by blocking the cavities to provide additional holding power. This secures piston 528 between the two pistons 508 and 510 and maintains piston ram assembly 506 in the centered position.

Figure 6B:
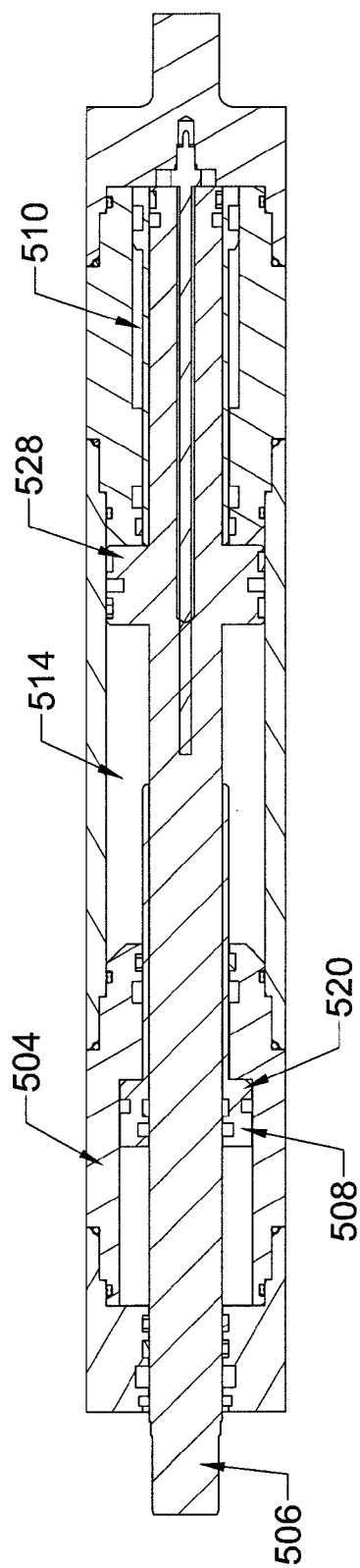
FIG. 6B is a cross-sectional view of a second embodiment of the centering cylinder in a retracted configuration.

Similarly to the previously described embodiment of the cylinder, when it is desired to extend or retract the shaft of piston 506 from casing 504, hydraulic fluid is pumped into or removed from cavities 514 or 516. Referring now to FIG. 6B, an embodiment of the centering cylinder is shown in a retracted position. The hydraulic fluid is pumped into cavity 514 and removed from cavity 516, exerting pressure on piston 528 sufficient to overcome the pressure of the fluid in cavity 518, and piston 528 moves toward cavity 518, pushing the piston 510 into cavity 518 and retracting the shaft of piston ram assembly 506 into casing 504. Piston 508 is maintained against bulkhead 520 by hydraulic pressure in cavity 512, and as piston 506 retracts past the centered position, the sleeve of piston 508 is separated from piston 528.

Figure 6C:
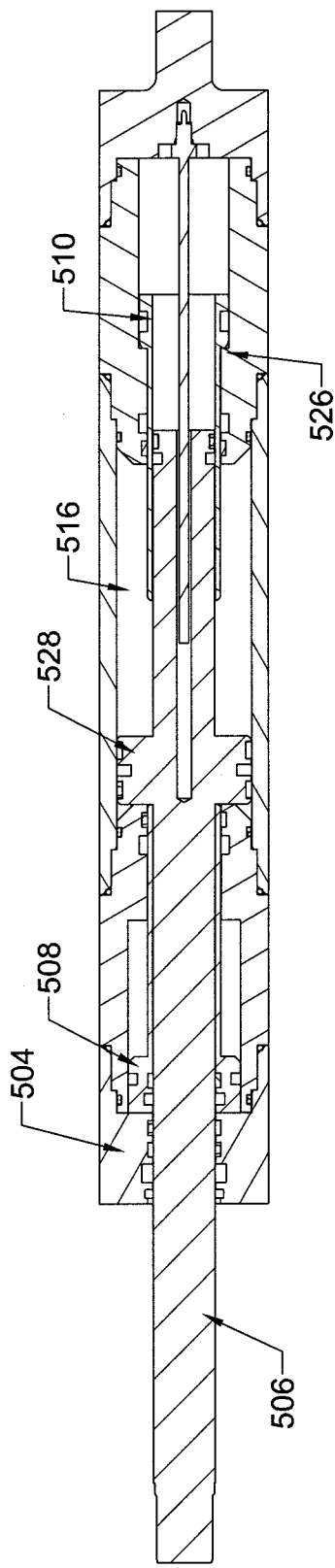
FIG. 6C is a cross-sectional view of a second embodiment of the centering cylinder in an extended configuration.

Referring now to FIG. 6C, an embodiment of the centering cylinder is shown in an extended position. Hydraulic fluid is pumped into cavity 516 and removed from cavity 514, exerting pressure on piston 528 sufficient to overcome the pressure of the fluid in cavity 512, and piston 528 moves toward cavity 512, pushing the piston 508 into cavity 512 and extending the shaft of piston 506 out of casing 504. As the shaft is extended, piston 510 is maintained against bulkhead 526 by hydraulic pressure in cavity 518, and the shaft of piston 506 continues to slide past piston 510 as it extends out of casing 504.

FIGS. 6B and 6C depict the cylinder in fully retracted and fully extended configurations, however with the application of appropriate hydraulic pressures, any intermediate position may be achieved and maintained by the cylinder.

Figure 7:
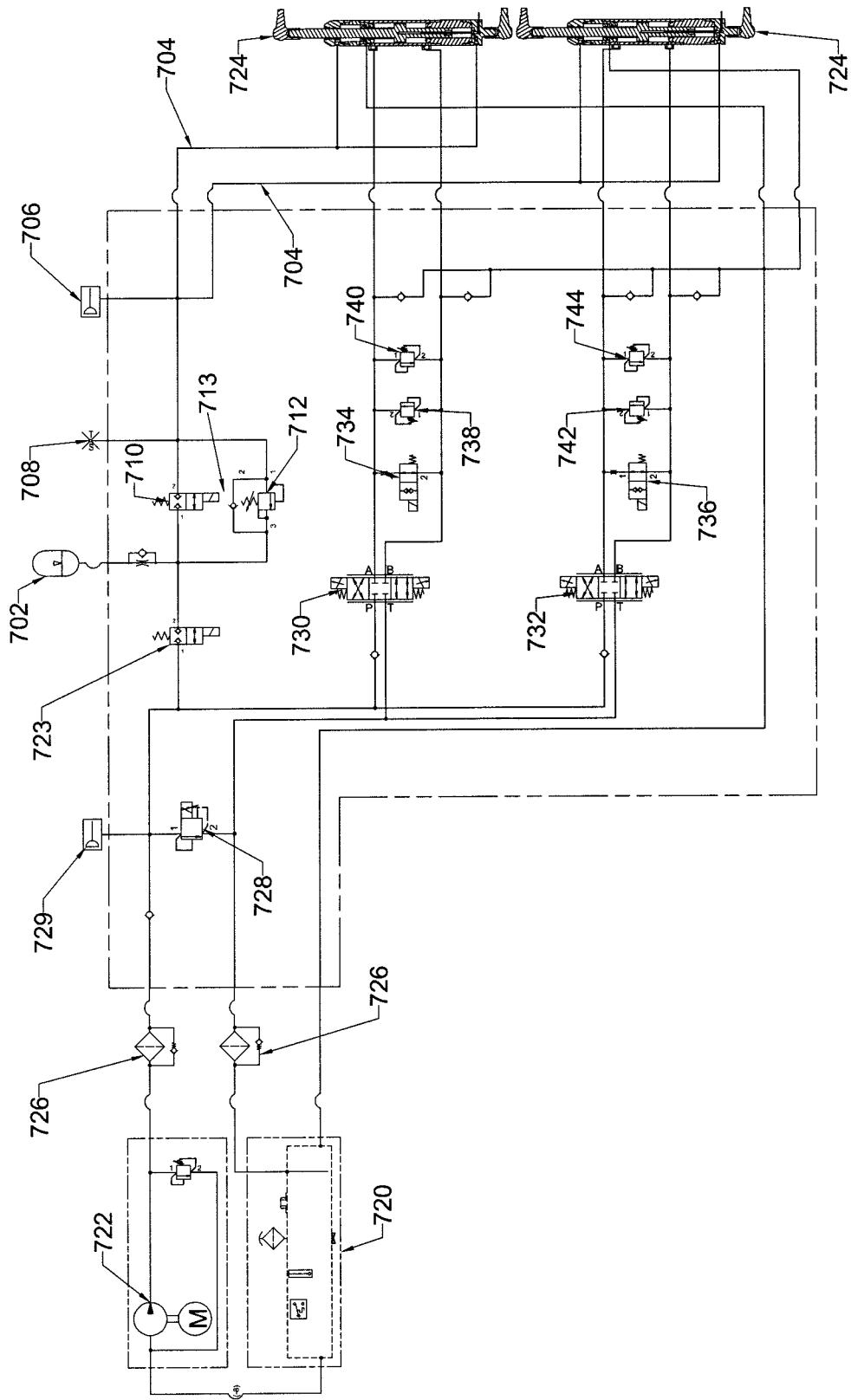
FIG. 7 is a schematic of an embodiment of the hydraulic control system of the redundant centering system.

As described above, hydraulic fluid is pumped into and out of the various cavities in the cylinder to actuate the cylinder, and to return it to the centered position. Referring now to FIG. 7, a schematic of the hydraulic control system is provided. The hydraulic control system shown in FIG. 7 incorporates two centering cylinders 724 as may be typical in an installation of the system on a dual axle trailer. In other embodiments one or more centering cylinders may be provided depending on the requirements of the vehicle on which the system is to be installed.

The hydraulic control system comprises several interconnected subsystems. A centering circuit provides the centering pressure exerted through cavities 228 and 236. A steering circuit provides control for the extension and retraction of the piston ram assembly 206. A drain circuit provides for the drain of hydraulic fluid from the cylinder. A power system provides the hydraulic fluid flow utilized by the control system. An embodiment of each system is described below with reference to FIG. 7.

The centering circuit comprises an accumulator 702 for storing and delivering energy to the hydraulic fluid in the centering circuit. Various types of accumulators may be utilized in the control system, however in the embodiment depicted in the Figure a gas-charged accumulator provides energy to the centering circuit by hydraulic fluidic connection between the hydraulic fluid reservoir in the accumulator and cavities 228 and 236. Hydraulic supply lines 704 provide the pressurized fluid to the cavities. The centering circuit may optionally include sensors 706 for measuring the pressure in the centering circuit, and test port 708 for external hydraulic connection to the centering circuit.

In the depicted embodiment, a blocking valve 710 is connected between the accumulator 702 and the cavities 228 and 236. During normal operation, the blocking valve 710 is energized and in the open position, allowing hydraulic fluid to flow back and forth between the accumulator and the centering cavities 228 and 236. If a failure in the power system should occur, the valve 710 will be de-energized and return to the blocking, or closed, position.

In parallel with the blocking valve 710, a relief valve 712 is provided to permit the flow of hydraulic fluid from the centering cavities 228 and 236 into the accumulator 702 at some set maximum pressure. In an embodiment of the control system, this maximum pressure may be 4,000 p.s.i. though other maximum pressures may be utilized as well. A check valve 713 allowing fluid flow from the accumulator 702 into cavities 228 and 236 is also provided in parallel with the relief valve 712.

During normal operation of the system, valve 710 is in the open position allowing fluid to flow back and forth through the cavities 228 and 236 and exerting the accumulator pressure on said cavities. In this operation, the control cavities 227 and 229 provide most of the holding power to maintain the centered position of the cylinder.

If system failure occurs, valve 710 closes, blocking fluid flow out of the centering cavities 228 and 236, while check valve 713 allows fluid flow into the chambers from the accumulator. The fluid in cavities 228 and 236 will exert sufficient pressure to return the cylinder to the centered position in total system failure.

Relief valve 712 provides protection for the centering circuit from external shocks. For example, forces from the road on the tires, such as a pot hole, may cause significant spikes in the pressure in the centering circuit which could damage the system if not relieved. Relief valve 712 may be set at a pressure such as 4,000 p.s.i. to allow the spikes to be relieved by flow of fluid from the centering circuit into the accumulator 702. This will cause the cylinder to move out of the centered position, however once the external force is removed, fluid will flow back from the accumulator 702 through check valve 713 into the centering circuit at the accumulator pressure, and return the cylinder to the centered position.

The power system comprises a reservoir 720 and pump 722. The pump 722 pumps fluid from the reservoir 720 to the centering cylinders 724 when energized by the electrical control system for the centering cylinder, described in relation to a later figure. The pump 722 may also provide fluid to the centering circuit through valve 723 when the valve is energized by the control system. The pump 722 is selected to have a capacity and power requirements appropriate for the system, and in some embodiments may comprise a 4 horsepower motor drawing 200 amperes at 24 volts. In some embodiments of the system, the output requirements for the motor are 2.0 gallons per minute at 3,000 p.s.i. and 4.2 gallons per minute at 500 p.s.i. Other power and output requirements may be appropriate depending on the size of the centering cylinder and the force requirements of the particular application in which the system is being utilized. The power for the pump may be provided from a variety of sources, such as a pony motor, tractor power take off, or other similar sources of power. In the embodiment described in the figures an electrical pump is utilized. The power system also may incorporate filters 726, relief valve 727 to prevent excessive pressure, proportional regulator 728, and pressure sensor 729.

The steering circuit comprises various components that receive instructions from the electrical control system, and respond by directing hydraulic fluid as necessary. In the embodiment shown in the figures, these components include proportional control valves 730 and 732, blocking valves 734 and 736, and relief valves 738, 740, 742 and 744. Other arrangements of components that allow control of hydraulic fluid as described herein are equally within the scope of the invention.

During normal operation blocking valves 734 and 736 remain energized and in the blocking position. The fluid trapped in chambers 227 and 229 provide additional holding force to maintain the cylinder in the centered position. If a power failure occurs these valves will de-energize and return to the default open position allowing the fluid in the steering chambers in cylinder 724 to evacuate to the reservoir 720, thus allowing the pressure from fluid in the centering chambers 228 and 236 to bring the cylinder back to the centered position.

During normal driving the cylinder remains in the centered position. When the system begins operation, the steering chambers are pressurized with hydraulic fluid to aid in holding the cylinder in the centered position. This provides extra holding power to the cylinder, necessary to withstand unequal braking or road forces that affect the suspension during normal operation. This is accomplished by de-energizing valves 734 and 736, which return to the closed position, locking the fluid in the steering chambers 227 and 229 and providing the extra required holding force.

During use of the cylinder, cavities 228 and 236 are maintained at substantially equal pressure which assures that piston 240 will be fully inserted into cavity 226 from the pressure on the head of piston 240, and that piston 224 of piston ram assembly 206 will be disposed against the end of the shaft of piston 240 by the pressure on the end of shaft 224. In some embodiments of the cylinder cavities 228 and 236 are maintained at a nominal pressure of 600 p.s.i. by accumulator 702, with a minimum pressure of 450 p.s.i. and a maximum pressure of 5000 p.s.i. During steering operation, the centering circuit pressure is overcome by pressure in the steering chambers and the cylinder is moved away from the centered position as previously described in relation to the centering circuit.

Figure 8:
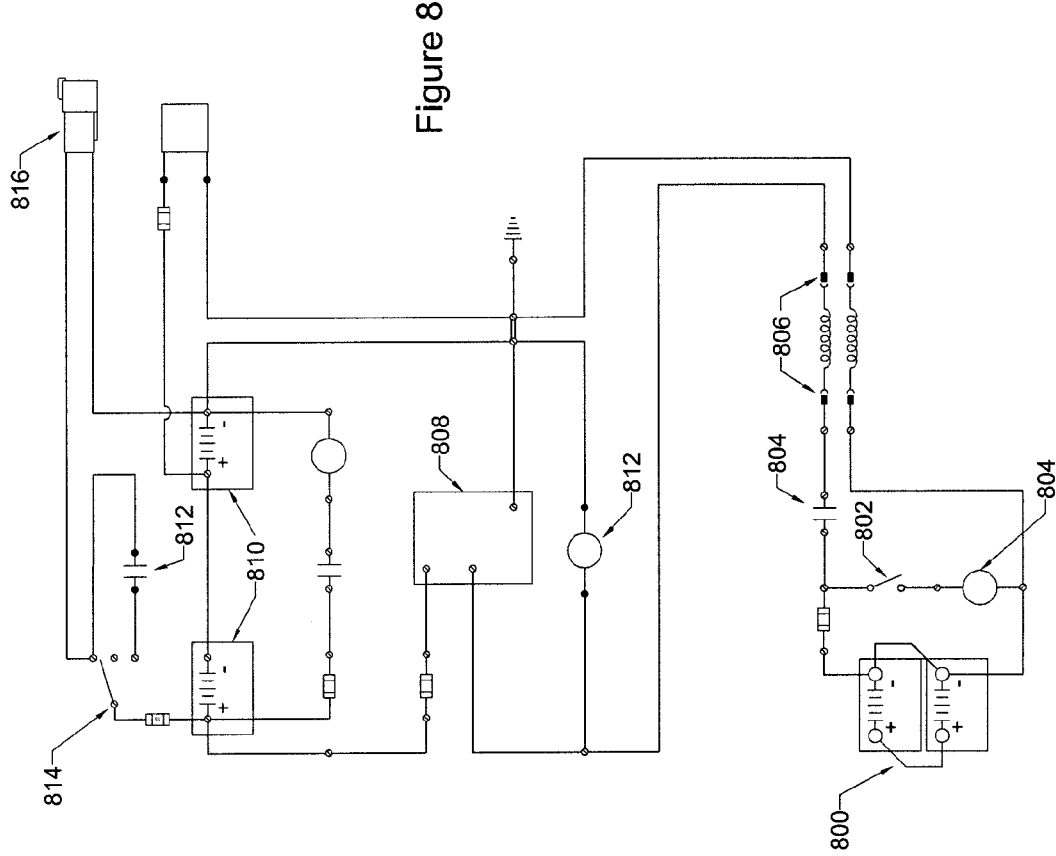
FIG. 8 is a schematic of an embodiment of the electrical control system of the redundant centering system.

Referring now to FIG. 8, a schematic of the electrical power system of an embodiment of the redundant centering system is depicted. Operation of the centering system is initiated from the cab of the tractor to which the trailer is attached. Tractor battery 800 is utilized during ignition of the tractor engine. Actuation of switch 802 energizes relay 804 which electrically connects the trailer power connectors 806 to battery 800. Power connectors 806 provide electrical power to battery controller 808, which regulates and transforms the voltage from battery 800 to charge batteries 810 which provide power to operate the hydraulic system. The power connectors 806 also energize relay 812.

The power system is provided with a switch 814 for configuring the state of the centering system. The switch 814 may be set to an "off" position, in which case the centering system is not activated by the ignition of the tractor engine. The switch 814 may also be provided with an "enable" setting whereby the system is activated by the ignition of the tractor engine. If the switch 814 is in the "enable" position, when the relay 812 is energized, it connects batteries 810 to controller 816 thus activating the initialization and operation of the system. Switch 814 may also be provided with a "ignition bypass" setting which allows the system to be operated without requiring a tractor ignition signal.

At various points throughout the control system, the speed of the trailer is determined to verify that the trailer is moving at a safe speed for any operation of the system. If the speed of the trailer is too high for a particular operation, the system automatically returns the cylinder to the centered position, or if that would be dangerous it keeps the cylinder in a safe state.

Controller 816 is a controller device of the type commonly known for receiving and storing programmed instructions and for executing the instructions and receiving inputs and providing outputs as directed by the programmed instructions. Controller 816 is electrically connected to the components of the hydraulic control system allowing it to modify the position of the various valves, regulators, pumps and other devices described above in relation to the hydraulic control system, and measure the values of various transducers. Optionally, a radio frequency receiver may be provided for accepting control inputs from a remote device for steering the axles from outside the cab of the truck.

Figure 9:
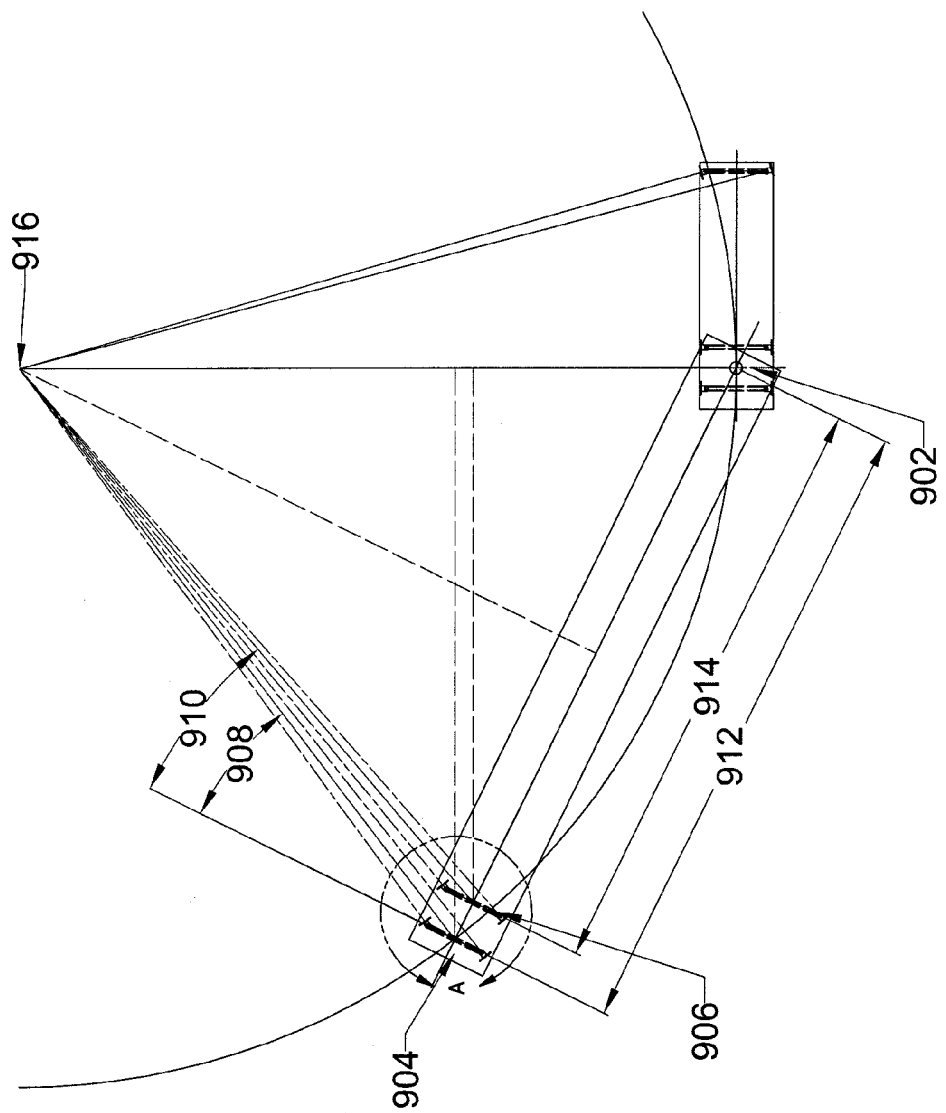
FIG. 9 is a top view of a truck and trailer incorporating an embodiment of the force steer axle assembly.

Referring now to FIG. 9, the geometry of an embodiment of the force steer system on a trailer is depicted. In some embodiments of the system, the force steer control system measures the yaw angle of the trailer with respect to the truck by means of a redundant kingpin angle sensor located on the kingpin 902 of the truck. Based on the yaw angle of the trailer and the length of the trailer, the controller 806 is programmed to determine the necessary steer angle for each axle 904 and 906 to allow the trailer to follow a determinate path. The length of the trailer may be input by the user of the system in device 802, or determined automatically by a string potentiometer on the trailer.

In FIG. 9 the trailer is shown following the path of the kingpin around a circle as the truck turns to the right, however in other embodiments the trailer could be steered to swing wide of the path of the kingpin or to turn at a more acute angle to the truck. Various geometries may be selected by the user through device 802. In the geometry shown in FIG. 9, the length of the truck and the turn angle of its front wheels identify a point 916 around which the truck is turning. This point 916 in combination with the length of the trailer allows the controller to calculate the appropriate steer angles for the trailer steer wheels.

The operator of the truck may also select to manually control the steer axles through a remote control unit that may be operated from the proximity of the trailer. This allows an operator to stand next to the trailer and adjust the angle of the steer axles as necessary.

In manual mode, the controller system for the steer axle compensates for the geometry by altering the commands sent to the proportional flow valves, described elsewhere, for the different axles. For example, the trailing axle 904 may receive the steering commands input by the operator, and axle 906 is provided commands calculated from the command sent to axle 904 altered by the Ackerman equation. In the depicted geometry, the angle 910 for axle 906 requires a cylinder stroke S2 for the cylinder on axle 906 equal to $(1/m)*\text{Atan}(D2*\text{Tan}(m*(S1)-3))/D1)+3$. S1 is the cylinder stroke for the cylinder on axle 904. The variable m is the mechanical steering linkage gain defined as the ratio of the angle 908 to stroke S1. The constant 3 is representative of the maximum stroke of each cylinder from center, either extended or retracted. D1 is the distance 912 from the trailer pivot to the axle 904 and D2 is the distance 914 from the trailer pivot to axle 906.

The control system also incorporates various safety features to improve the fault tolerance of the system. It measures the speed of the truck and as speed increases reduces the gain of the force steer system until at a certain speed the steering capability is effectively disabled.

The controller also utilizes the linear position sensors in the centering cylinder in combination to improve fault tolerance. Since the axles are set to a slightly different displacement, if the linear displacements measured by the LVDT's in the cylinders do not match then a fault in one of the sensors can be identified.

When the controller is switched into steer mode, it measures the yaw angle of the trailer and, based on the factors described above, determines the wheel angles necessary to steer the trailer as desired. The steer wheels are gradually turned to bring the trailer along the desired path. The turning speed of the steer wheels is typically limited by the pump speed of the pump providing fluid to the steering chambers.

If the pressure in the steering chambers is lost during operation, the pressure in the centering chambers will bring the steer wheels back to the centered position. The typical centering pressure is not sufficient to overcome the friction and turn the wheels in a static position, thus movement of the trailer is required to allow the centering pressure to act and center the piston and the wheels. Furthermore, the centering pressure is not sufficient to maintain the piston in the center position during typical driving conditions, where unequal forces from braking or road conditions could overload the centering pressure, causing the steer wheels to turn during high speed driving bring the trailer out of alignment with the truck. Thus the centering pressure is sufficient only to allow controlled stopping after loss of the steering controls.

Figure 10:
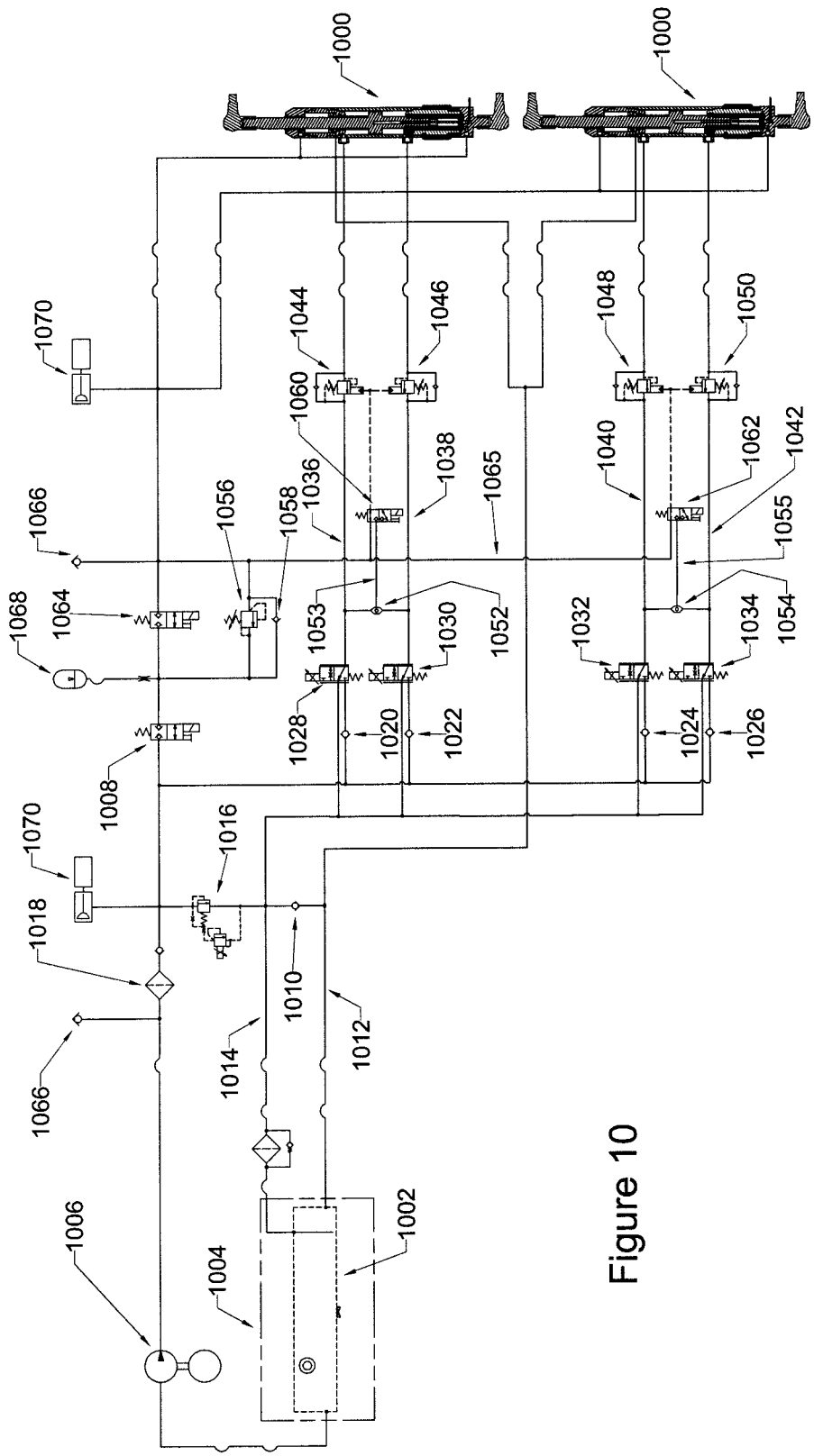
FIG. 10 is a schematic of a second embodiment of the hydraulic control system of the redundant centering system.
Figure 11:
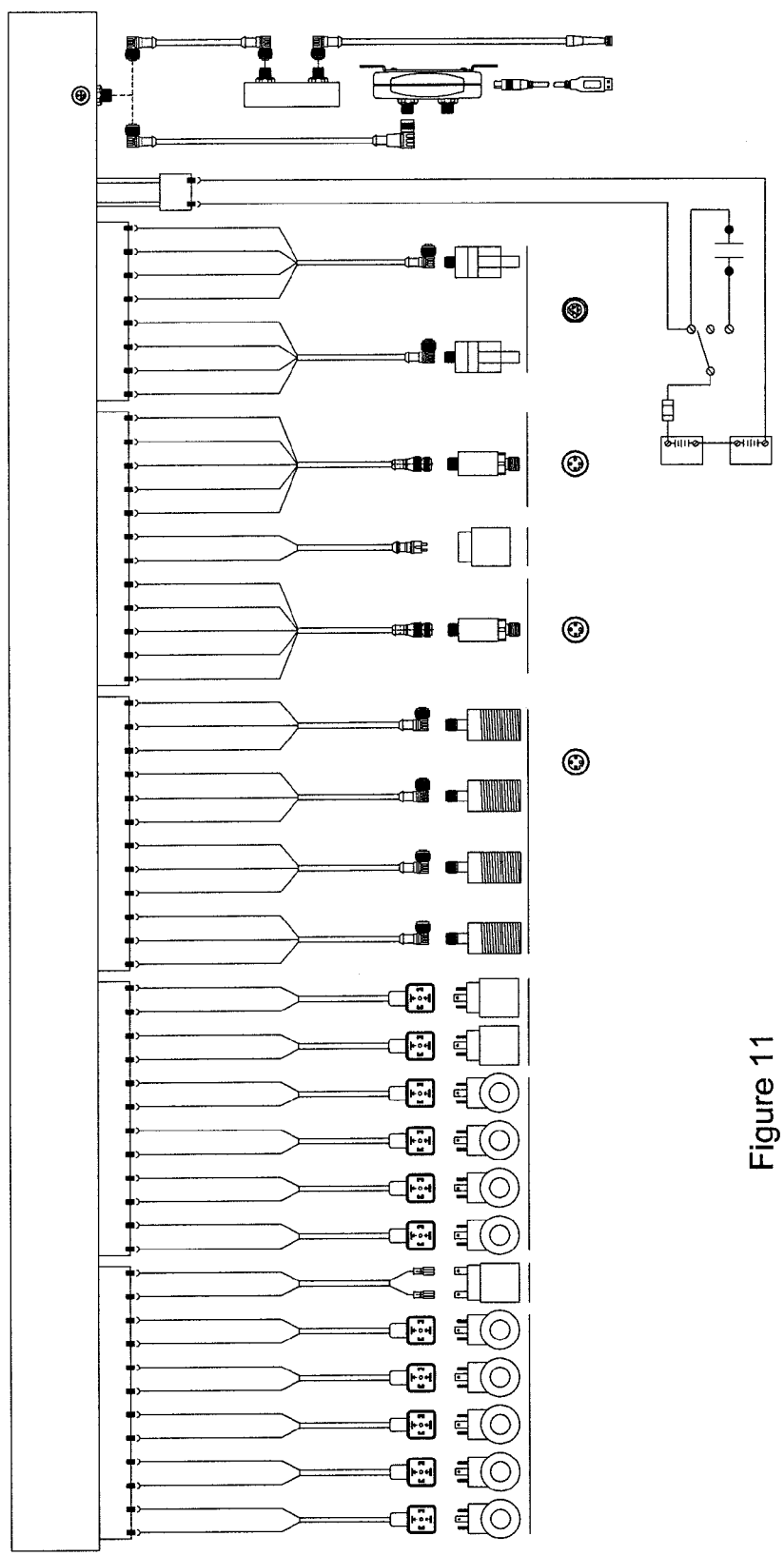
FIG. 11 is a schematic of a second embodiment of the electrical control system of the redundant centering system.

Referring now to FIG. 10, an alternative embodiment of the hydraulic control system of the present invention is depicted. Similarly to the previous embodiment of the hydraulic control system, is connected to and actuates two centering cylinders 1000. The alternative embodiment of the hydraulic control system comprises the same subsystems as previously described with respect to FIG. 7, including the centering circuit, the steering circuit, and the drain and supply, or power, circuits.

The power system depicted in FIG. 10 comprises a reservoir 1002 that is sealed and pressurized to prevent contamination from entering the system. The reservoir 1002 is typically provided with a breather 1004 to allow air into the reservoir 1002 while filtering any incoming air to remove potential contaminants. The breather 1004 may be optionally provided with a pressurized source of filtered air, not shown in FIG. 10, to further prevent contamination of the reservoir 1002. The reservoir 1002 provides hydraulic fluid to pump 1006, which provides the fluid to the steering circuit. The pump 1006 also provides hydraulic fluid to the centering circuit when valve 1008 is energized. During normal operation the valve 1008 is de-energized and the centering circuit is not connected to the pump 1006.

Check valve 1010 is provided between the drain line 1012 and the return line 1014 to allow hydraulic fluid to flow from the reservoir 1002 to counterbalance increased pressure in the centering cylinders 1000 generated by road forces. The operation of this check valve will be discussed in more detail below.

The steering circuit comprises a number of components that extend and retract the cylinders 1000 when the system is in steer mode. The embodiment of the steering circuit shown in FIG. 10 comprises the following components, although other embodiments could be utilized to operate the steering cylinders 1000 within the scope of the invention described herein. In the depicted embodiment, each cylinder 1000 is operated by components within the steering circuit. As stated before, there may be more or less cylinders 1000 in an actual embodiment of the invention as installed on a trailer, and the steering circuit components are adjusted accordingly.

Check valves 1020, 1022, 1024 and 1026 are provided on the input lines from pump 1006 to the steering circuit. These check valves allow hydraulic fluid to flow only from the pump into the steering circuit, and prevent backflow from the cylinders 1000 that might result from uneven or excessive pressures generated by road forces on the cylinders. In addition to the input line from pump 1006, a return line 1014 connects the steering circuit to reservoir 1002 to allow hydraulic fluid to flow back and forth as needed by the components of the steering circuit.

Four proportional flow control valves 1028, 1030, 1032 and 1034 are provided for controlling the flow of fluid from the pump 1006 and reservoir 1002 into the steering circuit. The output of check valve 1020 is connected to one input of valve 1028, the output of check valve 1022 is connected to one input of valve 1030, and so on. Similarly, the other inputs of the valves 1028, 1030, 1032 and 1034 are connected to the return line 1014. When the valves 1028, 1030, 1032 and 1034 are de-energized, the return line 1014 is open through the valves and the fluid flowing from the cylinders may return to the reservoir. The proportional flow control valves provide proportional steering control of the cylinders 1000 when in steer mode, further described below.

The lines 1036, 1038, 1040 and 1042 connect to the supply port of counterbalance valves 1044, 1046, 1048, and 1050. The load port of counterbalances 1044 and 1048 are attached to supply ports for chamber 227 in one of the cylinders 1000. The load port of counterbalance valves 1046 and 1050 are attached to the supply ports for chamber 229 in one of the cylinders 1000. The counterbalance valves allow fluid to be pumped into the chambers, but do not allow fluid to leave the chambers unless the counterbalance valve is opened. The valve will open if either the internal or external pilots reach a threshold pressure, in some embodiments roughly equal to the centering circuit pressure or approximately 600 p.s.i. The internal pilot prevents over-pressurization of the chambers in the cylinder 1000, and will open the counterbalance valve and allow fluid to evacuate the chamber when high pressures are generated by road forces, or other external forces, on the cylinder 1000. The counterbalance valves may have a external pilot assist ratio of 4.5:1, though in varying embodiments of the hydraulic control system other ratios may be utilized.

The same lines 1036, 1038, 1040 and 1042 also connect to the inputs of load shuttle valves 1052 and 1054. Load shuttle valve 1052 receives inputs from lines 1036 and 1038 and its output line 1053 is at a pressure equal to the higher pressure input line. Load shuttle valve 1054 interacts similarly with lines 1040, 1042 and 1055.

The output line 1053 is one input to pilot override valve 1060, and line 1055 is an input to pilot override valve 1062. The other input to pilot override valves 1060 and 1062 is line 1065 from the centering circuit at the pressure of the centering circuit accumulator, described elsewhere. When pilot override valves 1060 and 1062 are de-energized, the centering circuit pressure is passed through the valve as the external pilot to the counterbalance valves 1044, 1046, 1048 and 1050. When pilot override valves 1060 and 1062 are energized, the output of shuttle valves 1052 and 1054 will be passed through to the external pilot of the counterbalance valves as the external pilot.

The centering circuit is similar to the embodiment described in relation to FIG. 7. The centering circuit is provided with an accumulator 1068 for storing and delivering energy to the hydraulic fluid in the centering circuit. The accumulator is hydraulically connected to cavities 228 and 236 in cylinders 1000. The centering circuit supply to the cylinders is provided with a blocking valve 1064 for blocking the centering circuit if power is lost to the electrical control system, or other failures occur. A relief valve 1056 is provided to release hydraulic fluid from the centering cylinder cavities if valve 1054 is blocking flow, and some maximum pressure is developed within the centering cylinder cavities. In some embodiments the maximum allowed pressure in the centering chambers is 4,000 p.s.i. though other maximum pressures may be utilized as appropriate. Check valve 1058 allows fluid flow from the accumulator 1068 into the centering circuit when valve 1054 is in the closed, or blocking, position.

Various transducers and test ports may be provided at various points in the hydraulic control system to allow for appropriate monitoring and testing. In the embodiment shown in FIG. 10, test ports 1066 are provided, along with pressure transducers and temperature transducers 1070.

The hydraulic control system may be operated in various modes including center-hold mode, steering mode, and centering mode, which each have various submodes. The interaction of the various components in each mode is described in detail below.

The center-hold mode allows the trailer on which the cylinder 1000 is attached to operate without steering input from the cylinder 1000 during normal driving. In this mode, both the centering circuit and the steering circuit are utilized to hold the cylinder in the centered position. The cylinders 1000 are in the centered position. All the valves are de-energized except for the pilot override valves 1060 and 1062. Since it is de-energized, valve 1064 is in the blocking position and fluid in the centering chambers is held in place and exerts pressure in centering chambers 228 and 236 in cylinders 1000. The pressure on the sleeve piston 240 and ram 222 by the centering circuit fluid tends to hold the cylinder in the centered position as described with reference to FIG. 2B. External forces, such as road forces, on the cylinder may overcome the pressure of the centering circuit temporarily, and cause the fluid to move from one or the other centering chambers into the accumulator through relieve valve 1056.

In center-hold mode, the steering circuit is also utilized to boost the holding power of the centering circuit and prevent deviations from the centered position due to external forces. In this mode, proportional valves 1028, 1030, 1032, and 1034 are de-energized, blocking the pump lines and connecting the return line to the counterbalance valves. The pilot override valves 1060 and 1062 are energized and the external pilot input to counterbalance valves 1044, 1046, 1048 and 1050 are connected to the return to the reservoir 1002. Since the external pilot will be of low pressure, counterbalance valves will remain closed and will trap the hydraulic fluid in chambers 227 and 229 of cylinder 1000. This fluid will act on ram assembly 206 to hold it in the centered position. If external forces cause pressure in either chamber 227 or 229 to exceed the counterbalance threshold (in some embodiments, 4,000 p.s.i.) than the internal pilot on counterbalance valves 1044, 1046, 1048 and 1050 will open the counterbalance valves and allow fluid to drain into reservoir 1002 from the over-pressurized chamber and from reservoir 1002 into the other chamber. This prevents damage to the cylinder from external forces during driving.

In the center-hold mode, mechanical locks may also be provided to lock the cylinder, or other components of the steerable axle, into the centered position. These locks provide additional holding force and absorb the external forces placed on the cylinder. In some embodiments of the system, the mechanical locks are pneumatic cylinder that is spring extended to lock and air pressurized to retract and unlock the axle. The system may provide the operator a separate actuator or option for locking and unlocking the mechanical locks in coordination with or independently of the hydraulic system. Once the mechanical locks are unlocked, the user may either provide steering input to the system, or direct the system to attempt to center and relock the cylinder. The pump 1006 may be off during center-hold mode, or may continuing after transition from a different mode as necessary to avoid short-cycling of the pump and motor.

When the system is in center-hold mode with the mechanical locks open, if the operator provides steering input to the system it will transition to a steering mode that allows the wheels on the axle to which cylinder 1000 is attached to be steered according to that input. Upon the command of the system operator to steer either left or right, the system will first turn the pump 1002 on and then set relief valve 1016 to the appropriate operating pressure denoted PT1_Hi, which serves to limit the maximum pressure but does not control the actual pressure during operation. Then valve 1064 is energized, unblocking the centering chambers 228 and 236 from accumulator 1068, so that when the cylinder is extended or retracted the fluid in chambers 228 and 236 may flow into the accumulator 1068 as necessary. Pilot override valves 1060 and 1062 remain in the on position. Then depending on the direction of user steering input, one of the proportional flow control valves is opened for each cylinder. For the system depicted in FIG. 10, 1028 and 1032 would be simultaneously energized to steer in one direction, and 1030 and 1034 would be energized to steer in the other direction.

For purposes of clarity, the flow of hydraulic fluid when valve 1028 is opened will be described. The operation of the system when valve 1030 is opened follows the same procedure with the actions reversed with respect to the valves and chambers in the cylinder. When valve 1028 is opened, the pressure in line 1036 will increase, also increasing the pressure in the external pilot line for the counterbalance valves 1044 and 1046 and in chamber 227. The external pilot line is typically set to operate at a ratio such as 4.5:1 to reduce the pilot pressure needed to open the counterbalance valve. The pumping of fluid through valve 1044 into chamber 227 of cylinder 1000 begins to extract or retract the cylinder accordingly, increasing pressure on the internal and external pilots on counterbalance valve 1046, causing it to open and allow fluid to drain from chamber 229.

When the operator stops providing steering input to the system, it transitions from the active steering mode, to a steer holding mode where the cylinder is held at the position to which it has been steered by the operator. This mode is similar to the center-locked position with the exception of the mechanical locks which are not utilized in the holding mode. First, whichever proportional flow control valve 1028 or 1030 that had been actuated is de-energized to block further flow from the pump, valve 1064 is closed to lock the fluid in the centering chambers 228 and 236, relief valve 1016 is closed, then pump 1006 is turned off. In this state both the centering and steering hydraulic systems hold the cylinder in a fixed position.

Once the operator begins to give steering input again, the system transitions back to the active steering mode by restarting the pump 1006, set relief valve 1016 to PT1_Hi, energize and open valve 1064, and then turn on whichever proportional flow control valve 1028 or 1030 is appropriate to extend or retract the cylinder 1000 as directed.

The proportional flow control valves allow the system to provide smooth steering input instead of simple "on/off" control of the cylinder. The control system utilizes this to "ramp" the flow up and down as the operator provides steering input. This results in smooth steering control that turns the wheels at a high rate while avoiding "jerky" on and off actuation. Each cylinder is provided with separate proportional control flow valves so that they cylinders may be independently controlled, as dictated by the geometry of the system installation. For example, the trailer geometry depicted in FIG. 9 requires different steering control to be given to the two axles in order to properly steer the trailer. Specifically, the Ackerman equation describes the geometrical relationship between the steering angles of the various axles depicted in FIG. 9.

The hydraulic system may also be instructed to return to center and lock in position by engaging a "lock" or "center" input, or otherwise commanding the system to return the cylinder to the centered position. If the system is currently in the centered position, the system will engage the mechanical locks. If the system is not in the centered position, the system controller, described in relation to a different figure, will provide steering commands designed to bring the cylinder back to the center position. Once the steering commands have brought the cylinder to the centered position then the mechanical locks are engaged.

If the system is unable to steer the cylinder back to the centered position within a set time period, the control system utilizes two centering modes to attempt to bring the cylinder to the centered position, an active mode and a passive mode. The system transitions to a passive centering mode if the cylinder is near to the center position. If the cylinder is not near to the centered position then the system transitions to an active centering mode. The system may also transition to the active centering mode after attempting passive centering without success.

In transitioning to the passive centering mode, both proportional flow control valves are de-energized to close them. Next the valve 1064 is closed to block the centering circuit from the accumulator 1068, and then the pilot override valves 1060 and 1062 are de-energized to switch the pilot override input to the counterbalance valves to the centering circuit line 1065. Finally, the pressure relief valve 1016 is closed and pump 1006 is turned off.

In the passive centering mode, only the pressure from accumulator 1068 provides centering force to the cylinder 1000. The pressure from the centering circuit on the external pilot causes counterbalance valves 1044, 1046, 1048 and 2050 to open allowing the fluid in the steering chambers 227 and 229 in the cylinder to flow into and out of the reservoir 1004 without resistance to centering pressure from the centering circuit. This allows the pressure in chambers 228 and 236 to bring the cylinder to the centered position.

If the passive centering still does not bring the cylinder to the center position in a specified period of time, then the system transitions to an active centering mode. When transitioning from the steering modes to active centering, the proportional flow control valves, the pilot override valves, and valve 1064 are all de-energized. The relief valve 1016 is set to a predetermined value and valve 1008 is energized to open pump flow into the centering circuit. The pump 1006 remains on in the active centering mode. If the system was in passive centering before the transition, the pump 1006 is first turned on, the valve 1008 opened to allow pump fluid into the centering circuit, and the relief valve 1016 set to a predetermined value. In this mode, the pump 1006 pushes fluid into the centering circuit and the centering chambers, bringing the cylinder to the centered position.

If the steering commands are not able to center the cylinder within a specified time period, or the passive or active centering procedures fail to complete within specified time periods, fault conditions will be generated and signaled to the user, and the system may potentially be shut down to prevent damage.

At system initialization at engine startup, the system performs various diagnostic and status checks which may vary in embodiments of the system. In one embodiment, if the cylinder is at the center position, it will enter the center-hold mode with the mechanical locks engaged. If the system was shut off with the cylinder in a non-centered position, then the mechanical locks may not be able to engage, and the system will enter the steer holding mode to hydraulically lock the cylinder in place until steering input is received from the operator. Other embodiments may alter the order of startup steps, and may automatically center a non-centered steer axle.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. An assembly for steering an axle comprising a centering cylinder, a hydraulic centering circuit, and a hydraulic steering circuit; wherein the hydraulic centering circuit and the hydraulic steering circuit are hydraulically connected to and actuate the centering cylinder;

wherein the centering cylinder comprises a casing having an interior surface and a first end and a second end and an aperture disposed in the first end thereof, a ram having a first end and a second end, a piston disposed at a point along the length of the ram, and a sleeve piston having a head end and a shaft end and slidably disposed on a cylindrical portion of the ram between the piston and the first end of the ram with the shaft end disposed adjacent to the piston;

wherein the ram, piston and sleeve piston are disposed within the casing with the first end of the ram extending through the aperture in the casing;

wherein the casing further comprises a first bulkhead for stopping the sleeve piston when the shaft end of the sleeve is in contact with the piston and the piston is at a centered position within the casing, and a second bulkhead for stopping the piston when the ram is fully inserted into the casing;

wherein the first end of the casing and the head end of the sleeve piston define a first centering chamber, and the second end of the ram and the second bulkhead define a second centering chamber;

wherein the piston and the first bulkhead define a first steering chamber, and the piston and the second bulkhead define a second steering chamber;

wherein when the hydraulic centering circuit pressurizes the first and second centering chambers the piston is disposed at the centered position;

wherein the steering circuit comprises a control valve for controlling the flow of hydraulic fluid between the first and second steering chambers;

wherein in a powered centering mode the first and second steering chambers are pressurized when the piston is disposed in the centered position, and then the control valve is closed to block the flow of fluid into or out of the first and second steering chambers.

2. A process for steering a vehicle comprising the steps of:
providing a steerable axle on the vehicle;
providing an assembly for steering an axle according to claim 1 attached to the steerable axle for actuating the steering components thereof;
pressurizing the first and second centering chambers to position the piston in the centered position;
pressurizing the first and second steering chambers to hold the piston in the centered position;
closing the control valve to prevent the flow of fluid between the first and second steering chambers in the powered centering mode.

3. The process of claim 2 wherein if the assembly of claim 1 loses power the control valve will open and the piston will return to the centered position as a result of pressure from the hydraulic centering circuit on the first and second centering chambers.

4. The assembly for steering an axle of claim 1 wherein in an unpowered centering mode the proportional control valve is opened allowing fluid flow between the first and second steering chambers and the pressure in the first and second centering chambers urges the piston to the centered position and maintains in substantially in the centered position.

5. The assembly for steering an axle of claim 4 further comprising a second sleeve piston having a head end and a shaft end and slidably disposed on the cylindrical portion of the ram between the piston and the second end of the ram with the shaft end disposed adjacent to the piston; wherein the second centering chamber is defined by head end of the second sleeve piston and the second bulkhead.

* * * * *